US012684449B2

(12) United States Patent
Yang

(10) Patent No.: US 12,684,449 B2
(45) Date of Patent: Jul. 14, 2026

(54) INDICATION METHODS, INDICATION DEVICE AND STORAGE MEDIUM

(71) Applicant: Beijing Xiaomi Mobile Software Co., Ltd., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 324 days.

(21) Appl. No.: 18/541,946

(22) Filed: Dec. 15, 2023

(65) Prior Publication Data

US 2024/0114422 A1 Apr. 4, 2024

Related U.S. Application Data

(63) Continuation of application No. PCT/CN2021/100711, filed on Jun. 17, 2021.

(51) Int. Cl.
*H04W 36/00* (2009.01)
*H04W 36/36* (2009.01)

(52) U.S. Cl.
CPC ..... *H04W 36/362* (2023.05); *H04W 36/0055* (2013.01)

(58) Field of Classification Search
CPC ........... H04W 36/362; H04W 36/0055; H04W 36/249; H04W 76/27; H04W 36/0011; H04W 36/305
USPC .................................. 455/436, 437; 370/338
See application file for complete search history.

(56) References Cited

U.S. PATENT DOCUMENTS

| | | | |
|---|---|---|---|
| 2020/0396660 A1 | 12/2020 | Wu et al. | |
| 2021/0051550 A1* | 2/2021 | Latheef | ................. H04W 36/08 |
| 2021/0105690 A1 | 4/2021 | Wu et al. | |
| 2021/0227442 A1* | 7/2021 | Yiu | ................. H04W 36/00837 |
| 2021/0297907 A1 | 9/2021 | Jokela et al. | |
| 2021/0360495 A1 | 11/2021 | Lovlekar et al. | |
| 2023/0217335 A1* | 7/2023 | Xie | ................... H04W 36/0058 370/331 |
| 2024/0179604 A1* | 5/2024 | Wu | ...................... H04W 36/249 |

FOREIGN PATENT DOCUMENTS

| | | |
|---|---|---|
| CN | 111557110 A | 8/2020 |
| CN | 111866937 A | 10/2020 |
| CN | 112823543 A | 5/2021 |
| CN | 112970289 A | 6/2021 |
| WO | 2020122797 A1 | 6/2020 |
| WO | 2020128966 A1 | 6/2020 |

(Continued)

OTHER PUBLICATIONS

ISA State Intellectual Property Office of the People's Republic of China, International Search Report Issued in Application No. PCT/CN2021/100711, Mar. 1, 2022, WIPO, 2 pages.

(Continued)

*Primary Examiner* — Marcos Batista
(74) *Attorney, Agent, or Firm* — Volpe Koenig

(57) ABSTRACT

In some examples, indication methods, an indication device and a storage medium are provided. One of the indication methods comprises: determining a release condition for a conditional handover (CHO) handover command, and releasing the CHO handover command in response to the release condition being satisfied.

11 Claims, 7 Drawing Sheets

Network Device

Terminal          Terminal

(56) References Cited

FOREIGN PATENT DOCUMENTS

WO      2021030324 A1    2/2021

OTHER PUBLICATIONS

Intel Corporation, "Exit condition for conditional handover",3GPP TSG RAN WG2 Meeting #106 R2-1906294,May 3, 2019, 5 pages.
State Intellectual Property Office of the People's Republic of China, Office Action and Search Report Issued in Application No. 2021800018253, Aug. 2, 2023, 14 pages. (Submitted with Machine/ Partial Translation).
State Intellectual Property Office of the People's Republic of China, Office Action and Search Report Issued in Application No. 202180001825.3, Mar. 6, 2024, 14 pages.
State Intellectual Property Office of the People's Republic of China, Office Action and Search Report Issued in Application No. 202180001825.3, Jun. 2, 2024, 19 pages.
State Intellectual Property Office of the People's Republic of China, Decision of Rejection Issued in Application No. 202180001825.3, Jul. 19, 2024, 21 pages.
ISA State Intellectual Property Office of the People's Republic of China, Written Opinion of the International Searching Authority Issued in Application No. PCT/CN2021/100711, Mar. 1, 2022, WIPO, 7 pages.

* cited by examiner

Network
Device

Terminal                    Terminal

Determine a release condition for a CHO handover command — S11

Release the CHO handover command in response to the release
condition being satisfied — S12

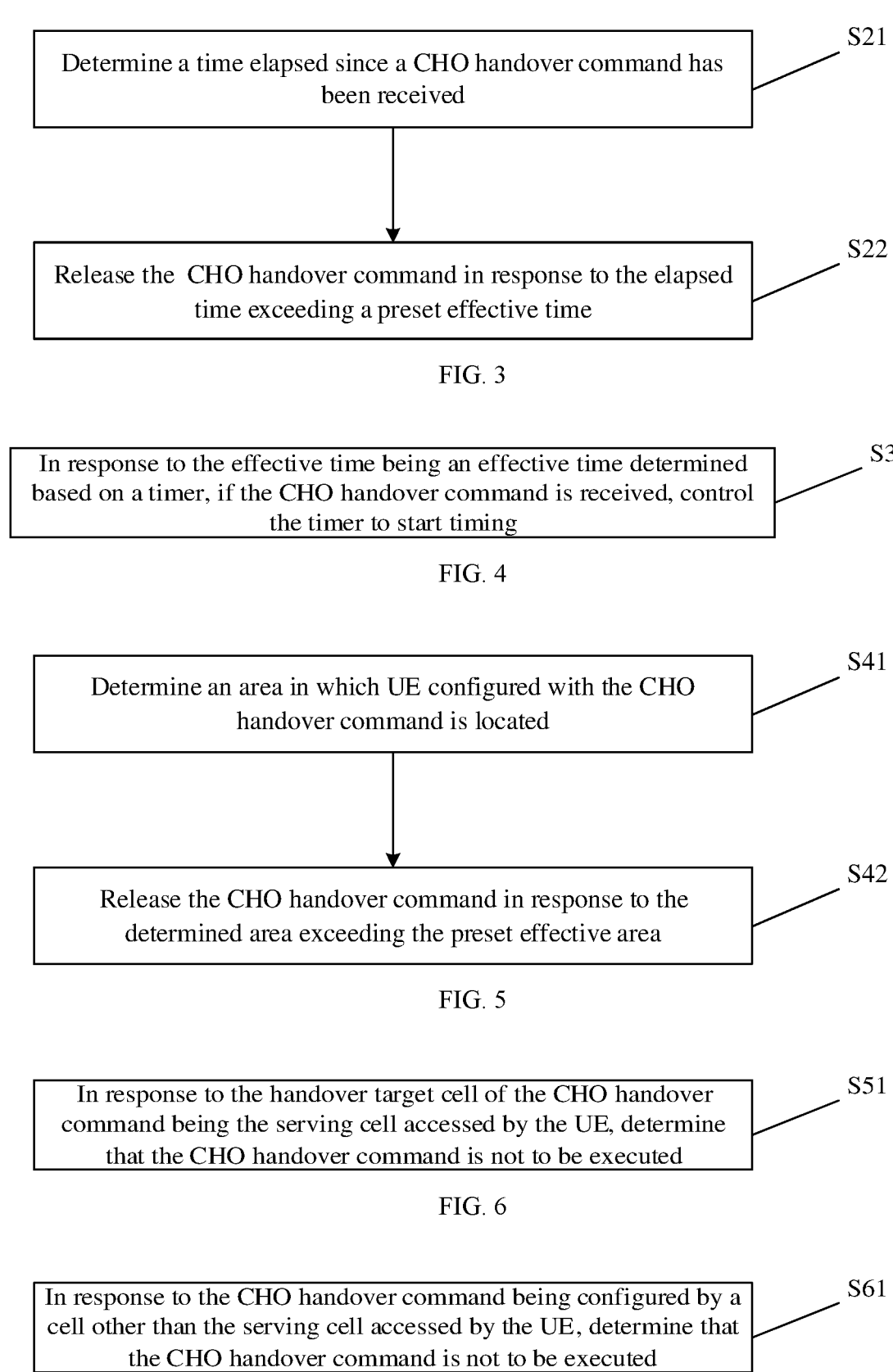

Determine a time elapsed since a CHO handover command has been received — S21

Release the CHO handover command in response to the elapsed time exceeding a preset effective time — S22

FIG. 3

In response to the effective time being an effective time determined based on a timer, if the CHO handover command is received, control the timer to start timing — S31

FIG. 4

Determine an area in which UE configured with the CHO handover command is located — S41

Release the CHO handover command in response to the determined area exceeding the preset effective area — S42

FIG. 5

In response to the handover target cell of the CHO handover command being the serving cell accessed by the UE, determine that the CHO handover command is not to be executed — S51

FIG. 6

In response to the CHO handover command being configured by a cell other than the serving cell accessed by the UE, determine that the CHO handover command is not to be executed — S61

FIG. 7

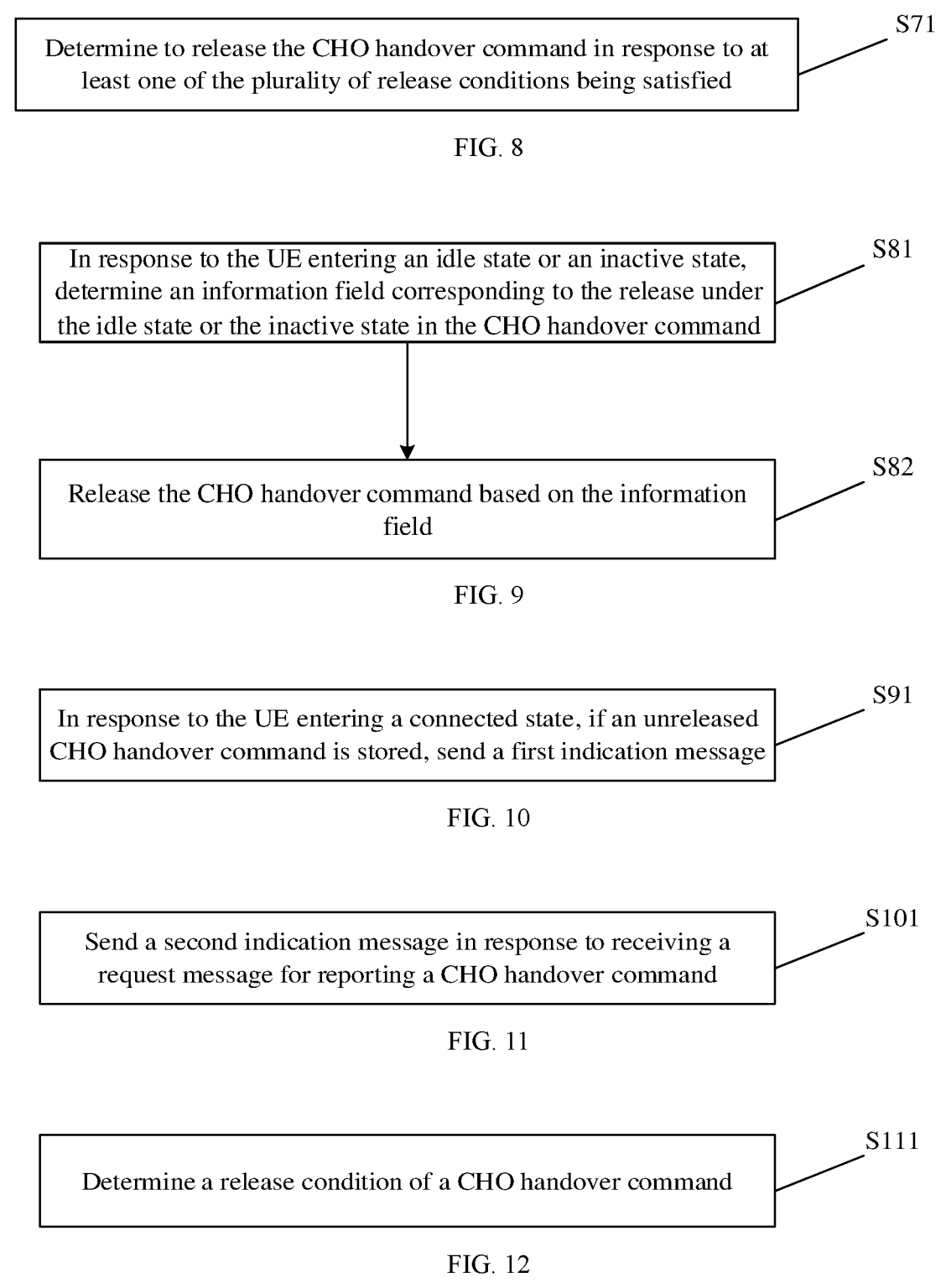

Determine to release the CHO handover command in response to at least one of the plurality of release conditions being satisfied — S71

FIG. 8

In response to the UE entering an idle state or an inactive state, determine an information field corresponding to the release under the idle state or the inactive state in the CHO handover command — S81

Release the CHO handover command based on the information field — S82

FIG. 9

In response to the UE entering a connected state, if an unreleased CHO handover command is stored, send a first indication message — S91

FIG. 10

Send a second indication message in response to receiving a request message for reporting a CHO handover command — S101

FIG. 11

Determine a release condition of a CHO handover command — S111

FIG. 12

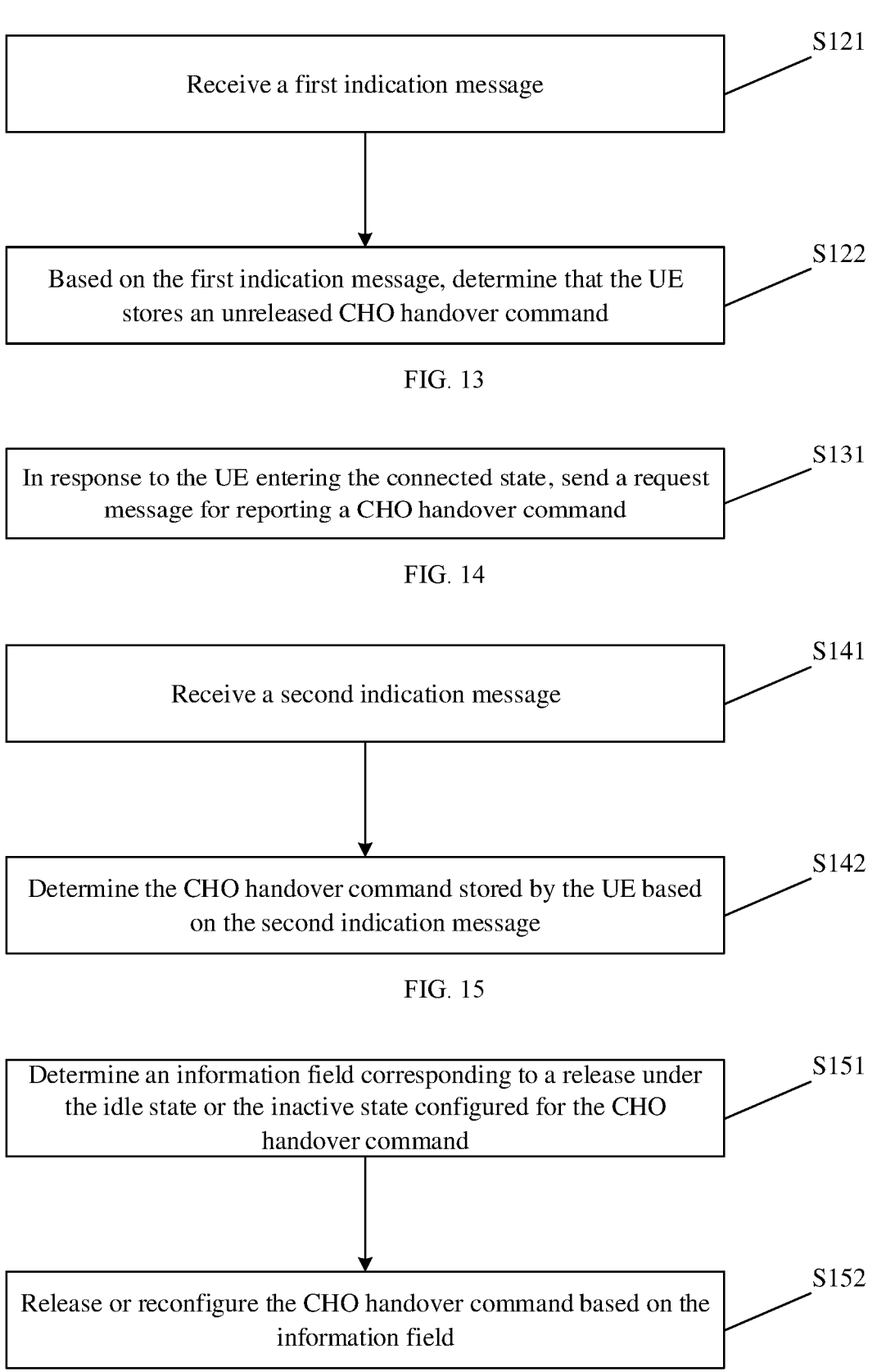

S121

Receive a first indication message

S122

Based on the first indication message, determine that the UE stores an unreleased CHO handover command

In response to the UE entering the connected state, send a request message for reporting a CHO handover command

Receive a second indication message

S142

Determine the CHO handover command stored by the UE based on the second indication message

Determine an information field corresponding to a release under the idle state or the inactive state configured for the CHO handover command

S152

Release or reconfigure the CHO handover command based on the information field

INDICATION METHODS, INDICATION DEVICE AND STORAGE MEDIUM

CROSS REFERENCE TO RELATED APPLICATIONS

This application is a continuation application of International Application No. PCT/CN2021/100711, filed on Jun. 17, 2021, the disclosure of which is incorporated herein by reference in its entirety for all purposes.

TECHNICAL FIELD

The present disclosure relates to the field of wireless communication technology, and in particular to indication methods, an indication device and a storage medium.

BACKGROUND

Conditional Handover (CHO) is proposed in the new generation communication technology, wherein a network device can configure CHO handover commands for a user equipment (UE) in advance. If the conditions of CHO are met, the UE is triggered to perform handover without the need for the network device to send a handover command to the UE. Since a UE may need to perform handover frequently, in order to reduce signalling overheads and frequent release of CHO commands, a serving cell may indicate the release of the CHO handover commands.

SUMMARY

In some embodiments, the present disclosure provides indication methods, an indication device and a storage medium.

According to a first aspect of embodiments of the present disclosure, there is provided an indication method, which is applied to a user device (UE) and comprises: determining a release condition for a conditional handover (CHO) handover command; releasing the CHO handover command in response to the release condition being satisfied.

According to a second aspect of embodiments of the present disclosure, there is provided an indication method, which is applied to a network device and comprises: determining a release condition for a CHO handover command, where the release condition is used to instruct a UE to release the CHO handover command if the release condition is satisfied.

According to a third aspect of an embodiment of the present disclosure, an indication device is provided, including: a processor; and a memory for storing processor-executable instructions; wherein the processor is configured to perform the indication method of the first aspect or any embodiment of the first aspect, or to perform the indication method of the second aspect or any embodiment of the second aspect.

It should be understood that both the above general description and the following detailed description are exemplary and explanatory only and are not restrictive of the disclosure.

BRIEF DESCRIPTION OF DRAWINGS

The accompanying drawings, which are incorporated in and constitute a part of this specification, illustrate embodiments consistent with the disclosure and, together with the description, serve to explain the principles of the disclosure.

FIG. 3 is a flowchart illustrating an indication method according to an exemplary embodiment.

FIG. 4 is a flowchart illustrating an indication method according to an exemplary embodiment.

FIG. 5 is a flowchart illustrating an indication method according to an exemplary embodiment.

FIG. 6 is a flowchart illustrating an indication method according to an exemplary embodiment.

FIG. 7 is a flowchart illustrating an indication method according to an exemplary embodiment.

FIG. 8 is a flowchart illustrating an indication method according to an exemplary embodiment.

FIG. 9 is a flowchart illustrating an indication method according to an exemplary embodiment.

FIG. 10 is a flowchart illustrating an indication method according to an exemplary embodiment.

FIG. 11 is a flowchart illustrating an indication method according to an exemplary embodiment.

FIG. 12 is a flowchart illustrating an indication method according to an exemplary embodiment.

FIG. 13 is a flowchart illustrating an indication method according to an exemplary embodiment.

FIG. 14 is a flowchart illustrating an indication method according to an exemplary embodiment.

FIG. 15 is a flowchart illustrating an indication method according to an exemplary embodiment.

FIG. 16 is a flowchart illustrating an indication method according to an exemplary embodiment.

DETAILED DESCRIPTION

Figure 1:
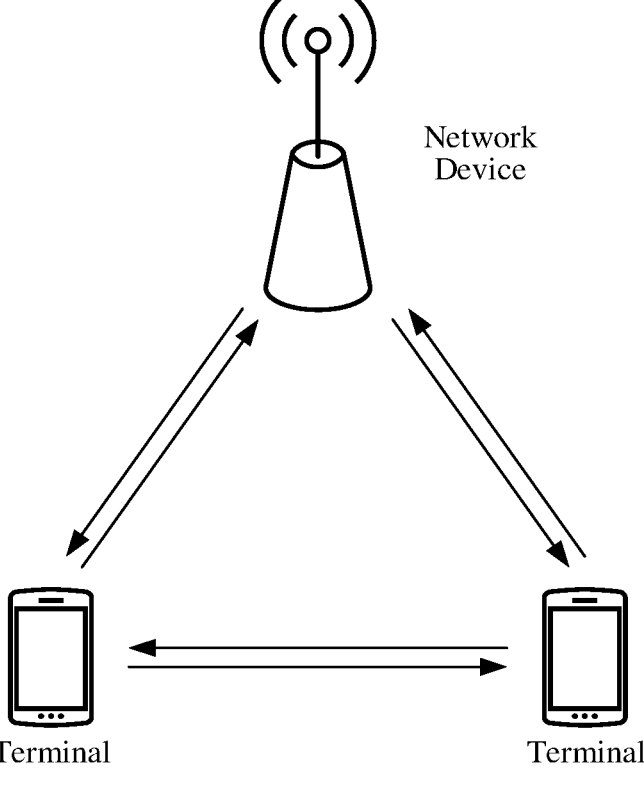
FIG. 1 is an architecture diagram of a communication system including a network device and terminals according to an exemplary embodiment.

Exemplary embodiments will be described in detail herein, with the illustrations thereof represented in the drawings. When the following descriptions involve the drawings, the same numerals in different drawings refer to same or similar elements unless otherwise indicated. The embodiments described in the following examples do not represent all embodiments consistent with the examples of the present disclosure. Rather, they are merely examples of devices and methods consistent with some aspects of the present disclosure as detailed in the appended claims.

In the new generation of communication technology, CHO is proposed, wherein a network device can configure a CHO handover command for a UE in advance. When the condition of CHO is satisfied, the UE is triggered to execute the handover without requiring the network device to send a handover command. The CHO handover command may include a handover target cell, configurations of the handover target cell, and a handover trigger condition. When the CHO handover command configured by the network device is satisfied, the UE can initiate a handover process by itself, which can avoid a radio link failure caused by a base station sending the handover instruction too late. After the UE completes the handover, the CHO handover command configured by a source cell will be released. In ultra-dense coverage networks, a UE may need to perform frequent handovers between cells. Since the UE may need to perform frequent handovers, in order to reduce signaling overheads and frequent release of the CHO conditional handover commands, a serving cell may indicate the release of the CHO handover commands.

Additionally, CHO is an optional function of a network device, and there are cells that do not support the CHO function. If the UE performs a handover to a cell that does not support the CHO function, the UE will not release the CHO handover commands of the source cell after the handover, and if the CHO handover commands of the source cell are retained, the UE may perform a handover to a serving cell again, which may cause unnecessary handovers of the UE, or cause handover failures and service interruption.

Based on this, the present disclosure provides an indication method, in which the UE releases the configured CHO handover command by itself after the release condition configured for the CHO handover command is satisfied. Therefore, avoiding problems such as handover failures and service interruption caused by the CHO handover commands not being released.

FIG. 1 is an architecture diagram of a communication system including a network device and terminals according to an exemplary embodiment. The indication method provided by the present disclosure may be applied to the architecture of the communication system shown in FIG. 1. As shown in FIG. 1, the network device may send signalings based on the architecture shown in FIG. 1.

It may be understood that the wireless communication system including the network device and the terminals shown in FIG. 1 is only a schematic illustration. The wireless communication system may further include other network devices, for example, a core network device, a wireless relay device, a wireless backhaul device and so on, which are not shown in FIG. 1. In the embodiment of the present disclosure, the number of network devices and the number of terminals included in the wireless communication system are not limited.

It can be further understood that the wireless communication system of the embodiments of the present disclosure means a network providing a wireless communication function. Wireless communication systems may employ different communication techniques such as code division multiple access (CDMA), wideband code division multiple access (WCDMA), time division multiple access (TDMA), frequency division multiple access (FDMA), FDMA), orthogonal frequency-division multiple access (OFDMA), single carrier frequency division multiple access (single Carrier FDMA, SC-FDMA), and Carrier Sense Multiple Access/Collision Avoidance (CSMA/CA). According to the capacity, speed, delay and other factors of different networks, the networks can be divided into 2G (generation) network, 3G network, 4G network or future evolution network, such as 5G network. 5G network can also be called New Radio (NR). For ease of description, this disclosure will sometimes refer to a wireless communication network simply as a network.

Furthermore, the network device involved in the present disclosure may also be referred to as a wireless access network device. The wireless access network device may be a base station, an evolved base station (evolved node B), a home base station, an access point (AP) in a wireless fidelity (WIFI) system, a wireless relay node, a wireless backhaul node, a transmission point (TP) or a transmission and reception point (TRP), etc., and may also be a gNB in an NR system. Additionally, or alternatively, it can also be a component or part of the equipment that constitutes the base station. In the case of a vehicle networking (V2X) communication system, the network device may also be a vehicle-mounted device. It should be understood that, in the embodiments of the present disclosure, the specific technology and the specific device form adopted by the network device are not limited.

Furthermore, a terminal involved in the present disclosure may also be referred to as a terminal device, User Equipment (UE), Mobile Station (MS), Mobile Terminal (MT), etc., and is a device that provides voice and/or data connectivity to a user. For example, the terminal may be a handheld device with a wireless connection function, a vehicle-mounted device, or the like. At present, examples of some terminals include a Mobile Phone, a pocket personal computer (PPC), a palmtop computer, a personal digital assistant (PDA), a notebook computer, a tablet computer, a wearable device, or a vehicle device, etc. In addition, in the case of a vehicle networking (V2X) communication system, the terminal device may also be a vehicle-mounted device. It should be understood that the embodiments of the present disclosure do not limit the specific technology and the specific device form adopted by the terminal.

Figure 2:
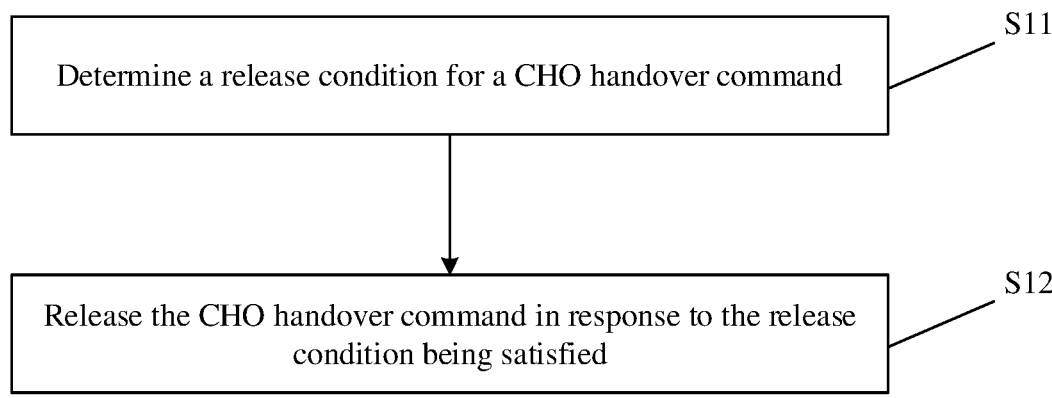
FIG. 2 is a flowchart illustrating an indication method according to an exemplary embodiment.

FIG. 2 is a flowchart illustrating an indication method according to an exemplary embodiment. As shown in FIG. 2, the indication method is applied to a UE and comprises steps S11 and S12.

In step S11, a release condition of a CHO handover command is determined.

In step S12, the CHO handover command is released in response to the release condition being satisfied.

In an embodiment of the present disclosure, the UE determines a release condition corresponding to the configured CHO handover command. If the UE determines that the release condition for releasing the CHO handover command is satisfied, the UE determines to release the configured CHO handover command.

By the indication method provided in the present embodiment, the UE can release the configured CHO handover command by itself in the case that the release condition is satisfied, so that situations such as handover failures and service interruption caused by the CHO handover commands not being released can be avoided.

In the embodiment of the present disclosure, the release condition of the CHO handover command configured for the UE may be configured by a network device or specified by a protocol. An effective time or effective area of the CHO handover command configured by a base station is stored in the UE at the beginning. Therefore, the handover failure caused by CHO handover command not being released can be avoided. In other embodiments of the present disclosure, the effective time or effective area can be distributed to the UE along with the CHO handover command or distributed to the UE separately by signalings or signals.

In some embodiments of the present disclosure, an effective time may be configured for a CHO handover command. If the time elapsed since the UE receives the CHO handover command configured for the UE until the current time exceeds the configured effective time, the UE determines to release the current CHO handover command. The effective time may be pre-configured for the UE by the network device, or may be predetermined based on a protocol. One way of configuring the effective time may be to configure a timer for the UE, and determine a duration of the timer based on a duration corresponding to the CHO handover command. The duration corresponding to the CHO handover command indicates a duration in which the CHO handover command is effective. The CHO handover instruction is released under the condition that the time period elapsed since the CHO handover command has been received by the UE exceeds the duration of the timer.

In other embodiments of the present disclosure, the UE may determine the time elapsed since the network device configured the CHO handover command. If the determined time exceeds the configured effective time, it is determined to release the current CHO handover command.

Another way for the network device to configure the effective time for the UE may also be to determine the effective time based on Coordinated Universal Time (UTC). The UE receives the CHO handover command, and further determines the current time, and releases the CHO handover command under the condition that the current time reaches a preset UTC time.

The effective area may also be configured for a CHO handover command in some embodiments of the present disclosure. If the area in which the UE locates exceeds the configured effective area, it is determined to release the CHO handover command. The effective area may be configured for the UE by the network device in advance, or may be determined based on a protocol in advance. A way of configuring the effective area may be to configure for the UE a list of cells in which the CHO handover command can be used. The UE determines to release the currently configured CHO handover command when a serving cell to which the UE belongs after a successful handover is not in the list.

Another way for the network device to configure the effective area for the UE may be to configure an absolute geographical location for the UE. That is, an area in which the CHO handover command can be used is configured for the UE, and the area is composed of a series of coordinate points. If that position of the UE is not in the area, the current CHO handover command is released.

Another way for the network device to configure the effective area for the UE may be to configure a relative geographical location for the UE. That is, a coordinate point and a radius from the coordinate point are determined according to a range in which the CHO handover command can be used, to obtain a relative position range. It is determined to release the current CHO handover command if the distance from the position of the UE to the coordinate point is not in the relative position range defined by the radius.

In some embodiments of the present disclosure, an effective time and an effective area may be configured for the UE. If the time period elapsed since the current CHO handover command has been received by the UE exceeds the effective time and/or the position of the UE exceeds the effective area, the current CHO handover command is released.

The following embodiments will be described for the effective time and effective area, respectively, in conjunction with the accompanying drawings.

FIG. 3 is a flowchart illustrating an indication method according to an exemplary embodiment. As shown in FIG. 3, the indication method is applied to a UE and comprises steps S21 and S22.

In step S21, a time elapsed since a CHO handover command has been received is determined.

In step S22, the CHO handover command is released in response to the elapsed time exceeding a preset effective time.

In the embodiment of the present disclosure, the UE determines a time elapsed since the CHO handover command configured by the network device has been received. If the elapsed time exceeds an effective time preset by the network device, the UE releases the CHO handover command.

FIG. 4 is a flowchart illustrating an indication method according to an exemplary embodiment. As shown in FIG. 4, the indication method is applied to a UE and comprises step S31.

In step S31, in response to the effective time being an effective time determined based on a timer, if the CHO handover command is received, the timer is controlled to start timing.

In some embodiments of the present disclosure, if the network device configures a timer for the UE, when the UE receives the CHO handover command configured by the network device, the UE starts the timing of the timer, and configures a duration of the timer based on a duration corresponding to the received CHO handover command. Additionally, or alternatively, under the condition that the UE is currently configured with a CHO handover command and the time elapsed since the current CHO handover command has been configured does not exceed the effective time of the timer, if a CHO handover command reconfigured by the network device is received, the UE determines to restart the timer based on the reconfigured CHO handover command. In other words, the timing of the timer is restarted.

FIG. 5 is a flowchart illustrating an indication method according to an exemplary embodiment. As shown in FIG. 5, the indication method is applied to a UE and comprises steps S41 and S42.

In step S41, an area in which UE configured with the CHO handover command is located is determined.

In step S42, the CHO handover command is released in response to the determined area exceeding the preset effective area.

In some embodiments of that present disclosure, an effective area may be configured for a CHO handover command. When the UE moves out of the preset effective area, the CHO handover command is determined to be released.

Illustratively, as in the included embodiments, an effective area may be determined based on the list of the cells. For example, after a successful handover of the UE, if the serving cell is not in the list, the CHO handover command is determined to be released.

Illustratively, as in the included embodiments, the effective area may be an absolute geographical location, for example, the absolute geographical location may be an area formed by a plurality of different coordinate points. It is determined to release the CHO handover command if the position of the UE exceeds the area.

Illustratively, as in the included embodiments, the effective area may also be a relative geographical location. For example, the position of a coordinate point is determined, and a relative position area is determined based on the coordinate point and a preset radius length. If the distance between the positions of the UE and the coordinate point exceeds the radius length, the CHO handover command is determined to be released.

In some embodiments of the present disclosure, the UE may also determine to release the CHO handover command after completing the handover operation based on the CHO handover command. That is, the CHO handover command with the serving cell as the target cell is released.

FIG. 6 is a flowchart illustrating an indication method according to an exemplary embodiment. As shown in FIG. 6, the indication method is applied to a UE and comprises step S51.

In step S51, in response to the handover target cell of the CHO handover command being the serving cell accessed by the UE, it is determined that the CHO handover command is not to be executed.

In the embodiment of the present disclosure, in the case that the target cell of the CHO handover command is the serving cell, the UE does not execute the CHO handover command, that is, the UE does not execute the handover command with the serving cell as the target cell.

FIG. 7 is a flowchart illustrating an indication method according to an exemplary embodiment. As shown in FIG. 7, the indication method is applied to a UE and comprises step S61.

In step S61, in response to the CHO handover command being configured by a cell other than the serving cell accessed by the UE, it is determined that the CHO handover command is not to be executed.

In the embodiment of the present disclosure, under the condition that the target cell of the CHO handover command is a serving cell accessed by the UE, if the current CHO handover command is configured by a cell other than the serving cell, the UE does not execute the CHO handover command. In other words, the UE does not execute the handover command with the serving cell as the target cell.

In an embodiment of the present disclosure, one or more release conditions may be configured for each CHO handover condition.

FIG. 8 is a flowchart illustrating an indication method according to an exemplary embodiment. As shown in FIG. 8, the indication method is applied to a UE and comprises step S71.

In step S71, it is determined to release the CHO handover command in response to at least one of the plurality of release conditions being satisfied.

In the embodiment of the present disclosure, if a plurality of release conditions are configured for the CHO handover command of the UE, it is determined to release the CHO handover command if at least one of the plurality of release conditions is satisfied. In other words, the release action of the UE to release the CHO handover command may be triggered by one or more or all of the plurality of release conditions being satisfied.

In yet another embodiment of the present disclosure, the CHO handover command is determined to be released in response to all of the plurality of release conditions being satisfied. That is, it is determined to release the CHO handover command in the case where the release conditions are simultaneously satisfied. If any one or more release conditions are satisfied, it cannot be determined to release the CHO handover command.

It is determined to release the CHO handover command based on that at least one of the plurality of release conditions is satisfied, or it is determined to release the CHO handover command based on that all of the plurality of release conditions are satisfied, which may be determined based on the network device or may be specified by a protocol. FIG. 9 is a flowchart illustrating an indication method according to an exemplary embodiment. As shown in FIG. 9, the indication method is applied to a UE and includes steps S81 and S82.

In step S81, in response to the UE entering an idle state or an inactive state, an information field corresponding to the release under the idle state or the inactive state in the CHO handover command is determined.

In step S82, the CHO handover command is released based on the information field.

In the embodiment of the present disclosure, if the UE enters an idle state or an inactive state, an information field corresponding to the release under the idle state or the inactive state in the CHO handover command is determined. The release of the CHO handover command is determined based on an indicator included in the information field.

Illustratively, the indicator may be a bit, where if the bit is 0, it is determined that the CHO handover command is released, and if the bit is 1, it is determined that the CHO handover command is not released.

FIG. 10 is a flowchart illustrating an indication method according to an exemplary embodiment. As shown in FIG. 10, the indication method is applied to a UE and includes step S91.

In step S91, in response to the UE entering a connected state, if an unreleased CHO handover command is stored, a first indication message is sent.

In the embodiment of the present disclosure, the first indication message is used to indicate to the serving cell that an unreleased CHO handover command is stored. After the UE enters the connected state from an idle state or an inactive state, if it is determined that the UE is currently configured with a CHO handover command, the UE sends a first indication message to the network device of the serving cell, informing the network device that the UE is currently configured with a CHO handover command before entering the connected state, that is, the UE currently stores an unreleased CHO handover command. The connected state being an active state or a state where the UE is no longer in the idle or inactive state.

In some embodiments of the present disclosure, the first indication message may include a network device identifier indicating a network device which has configured the CHO handover command. Wherein, the network device identifier is used for the network device of the serving cell to determine the release or the reconfiguration of the CHO handover command.

FIG. 11 is a flowchart illustrating an indication method according to an example embodiment. As shown in FIG. 11, the indication method is applied to a UE and includes step S101.

In step S101, a second indication message is sent in response to receiving a request message for reporting a CHO handover command.

Wherein the second indication message is configured to indicate the CHO handover command stored by the UE.

In the embodiment of the present disclosure, when the UE enters the connected state from an idle state or an inactive state, if receiving a request message for reporting a CHO handover command sent by a network device, the UE determines to send a second indication message to the network device to inform the network device of the configured CHO handover command.

In some embodiments of the present disclosure, the second indication message may include a network device identifier indicating a network device which has configured the CHO handover command. Wherein, the network device identifier is used for the network device of the serving cell to determine the release or the reconfiguration of the CHO handover command.

Based on the same/similar concept, the embodiment of the present disclosure further provides an indication device.

FIG. 12 is a flowchart illustrating an indication method according to an exemplary embodiment. As shown in FIG. 12, the indication method is applied to a network device and comprises step S111.

In step S111, a release condition of a CHO handover command is determined.

Wherein the release condition is used to instruct a UE to release the CHO handover command if the release condition is satisfied.

In the embodiment of the present disclosure, the network device may configure a release condition for the UE to release the CHO handover command. The UE may determine to release the configured CHO handover command based on the configured release condition.

By the indication method provided in this embodiment, the UE can release the configured CHO handover command by itself under the condition that the release condition is satisfied. Thus, situations such as handover failures and service interruptions caused by the CHO handover command not being released can be avoided.

In some embodiments of the disclosure, the network device configures at least one CHO handover command for the UE. And the network device configures an information field corresponding to the release under the idle state or the inactive state for each CHO handover command. Wherein the information field is used to instruct the UE whether to release the CHO handover command when the UE enters an idle state or an inactive state.

If the UE enters an idle state or an inactive state, it determines the information field corresponding to the release under the idle state or inactive state in the CHO handover command. It is determined whether to release the CHO handover command based on the indicator included in the information field.

Illustratively, the indicator may be a bit, where if the bit is 0, it is determined to release the CHO handover command, and if the bit is 1, it is determined not to release the CHO handover command.

FIG. 13 is a flowchart illustrating an indication method according to an example embodiment. As shown in FIG. 13, the indication method is applied to a network device and includes steps S121 and S122.

In step S121, a first indication message is received.

In step S122, based on the first indication message, it is determined that the UE stores an unreleased CHO handover command.

In some embodiments of the present disclosure, after the UE enters the connection state from the idle state or the inactive state, if it is determined that the UE is currently configured with a CHO handover command, the UE sends a first indication message to a network device of the serving cell, to inform the network device that the UE is configured with a CHO handover command before entering the connection state, that is, the UE currently stores an unreleased CHO handover command.

In some embodiments of the present disclosure, the first indication message may include a network device identifier indicating a network device which has configured the CHO handover command. Wherein the network device identifier is used by the network device of the serving cell to determine the release or the reconfiguration of the CHO handover command.

If the network device receives the first indication message sent by the UE, the network device determines that the UE stores an unreleased CHO handover command according to the received first indication message, and may determine to release or reconfigure the CHO handover command according to the network device identifier included in the CHO handover command.

FIG. 14 is a flowchart illustrating an indication method according to an example embodiment. As shown in FIG. 14, the indication method is applied to a network device and includes step S131.

In step S131, in response to the UE entering the connected state, a request message for reporting a CHO handover command is sent.

In the embodiment of the present disclosure, the network device determines that the UE enters the connected state from the idle state or the inactive state, and sends a request message to the UE to request the UE to report a CHO handover command.

FIG. 15 is a flowchart illustrating an indication method according to an example embodiment. As shown in FIG. 15, the indication method is applied to a network device and includes steps S141 and S142.

In step S141, a second indication message is received.

In step S142, the CHO handover command stored by the UE is determined based on the second indication message.

In the embodiment of the present disclosure, when the UE enters the connected state from the idle state or the inactive state, if receiving a request message for reporting a CHO handover command sent by the network device, the UE determines to send a second indication message to the network device to inform the network device of the configured CHO handover command.

In some embodiments of the present disclosure, the second indication message may include a network device identifier indicating a network device which has configured the CHO handover command. Wherein, the network device identifier is used for the network device of the serving cell to determine the release or the reconfiguration of the CHO handover command.

If the network device receives the second indication message, it determines the CHO handover command stored by the UE, and may determine to release or reconfigure the CHO handover command according to the network device identifier included in the CHO handover command.

FIG. 16 is a flowchart illustrating an indication method according to an example embodiment. As shown in FIG. 16, the indication method is applied to a network device and includes steps S151 and S152.

In step S151, an information field corresponding to a release under the idle state or the inactive state configured for the CHO handover command is determined.

In step S152, the CHO handover command is released or reconfigured based on the information field.

In the embodiment of the present disclosure, a network device determines an information field corresponding to a release under an idle state or an inactive state of a UE according to a CHO handover command reported by the UE, and further determines to release or reconfigure the CHO handover command based on an indicator in the information field.

Based on the same concept, the embodiment of the present disclosure further provides an indication device.

It can be understood that the indication device provided by the embodiment of the present disclosure includes a hardware structure and/or a software module corresponding to the execution of each function in order to realize the included functions. Embodiments of the present disclosure can be implemented in hardware or a combination of hardware and computer software, in conjunction with the elements and algorithm steps of the examples disclosed in the embodiments of the present disclosure. Whether a certain function is performed by hardware or computer software driving the hardware depends on the specific application and design constraints of the technical solution. Those skilled in the art may implement the described functionality using different methods for each particular application, but such implementations should not be considered beyond the scope of the embodiments of the disclosure.

Figure 17:
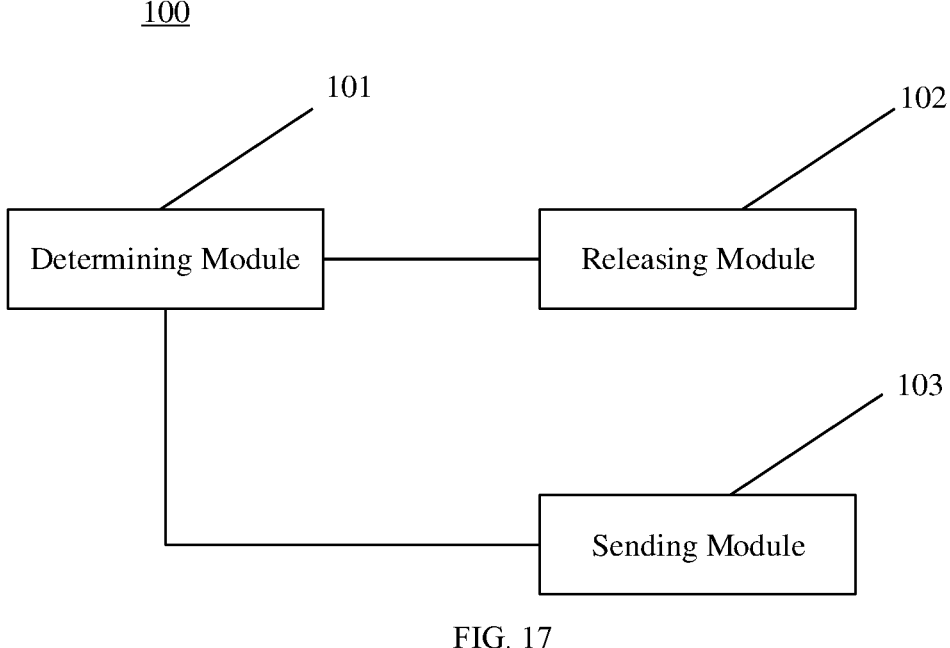
FIG. 17 is a block diagram illustrating an indication device according to an exemplary embodiment.

FIG. 17 is a block diagram illustrating an indication device according to an exemplary embodiment. Referring to FIG. 17, the indication device 100 is applied to a UE, and includes a determining module 101, a releasing module 102, and a sending module 103.

The determining module 101 is configured to determine a release condition for a CHO handover command. The releasing module 102 is configured to release the CHO handover command in response to the release condition being satisfied.

In the embodiment of the present disclosure, the determining module 101 is configured to determine a release condition based on indications of a network device or protocol provisions.

In the embodiment of the present disclosure, the releasing module 102 is configured to determine a time elapsed since the CHO handover command has been received by the UE, and release the CHO handover command in response to the elapsed time exceeding a preset effective time.

In the embodiment of the present disclosure, the determining module 101 is further configured to, in response to the effective time being an effective time determined based on a timer, control the timer to start timing if the CHO handover command is received.

In an embodiment of the present disclosure, the releasing module 102 is configured to determine an area in which the UE is configured with the CHO handover command, and release the CHO handover command in response to the determined area exceeding a preset effective area.

In the embodiment of the present disclosure, the releasing module 102 is configured to release the CHO handover command after completing a handover operation based on the CHO handover command.

In the embodiment of the present disclosure, the determining module 101 is further configured to, in response to the handover target cell of the CHO handover command being a serving cell, determine the CHO handover command is not to be executed and/or in response to the CHO handover command being configured by a cell other than the serving cell, determine that the CHO handover command is not to be executed.

In the embodiment of the present disclosure, the release condition is plural. The release module 102 is configured to determine to release the CHO handover command in response to at least one of a plurality of the release conditions being satisfied.

In the embodiment of the present disclosure, the releasing module 102 is configured to determine an information field corresponding to a release under the idle state or the inactive state in the CHO handover command in response to the UE entering the idle state or the inactive state, and release the CHO handover command based on the information field.

The sending module 103 is configured to, in response to the UE entering a connected state, if the UE stores an unreleased CHO handover command, send a first indication message configured indicate to a serving cell accessed by the UE that the UE stores an unreleased CHO handover command.

In the embodiment of the present disclosure, the sending module 103 is further configured to, in response to receiving a request message for reporting a CHO handover command, send a second indication message configured to indicate the CHO handover command stored by the UE.

In the embodiment of the present disclosure, either one or both of the first indication message and the second indication message include a network device identifier indicating a network device which has configured the CHO handover command. The network device identifier is used by a network device corresponding to the serving cell to determine to release or reconfigure the CHO handover command.

Figure 18:
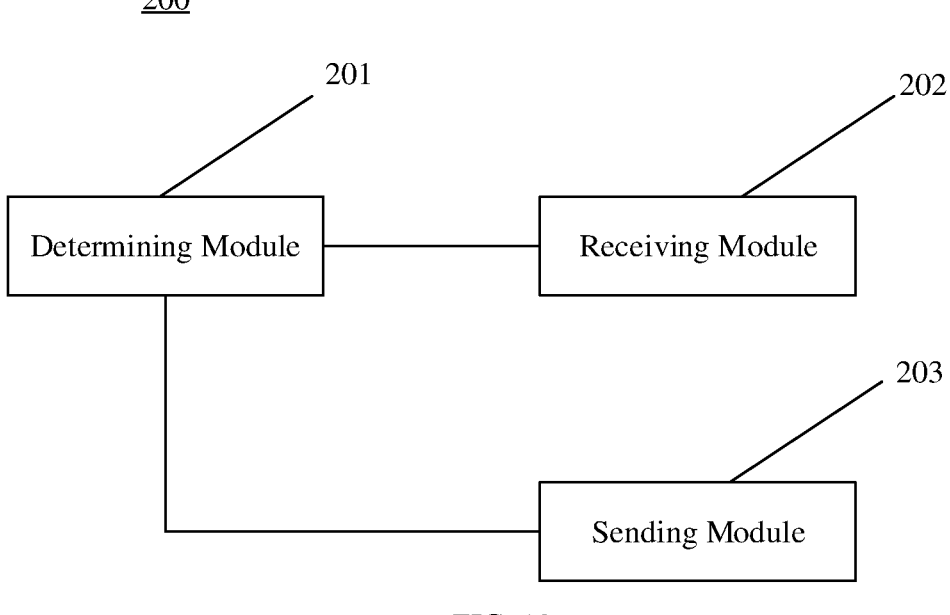
FIG. 18 is a block diagram illustrating an indication device according to an exemplary embodiment.

FIG. 18 is a block diagram illustrating an indication device according to an exemplary embodiment. Referring to FIG. 18, the indication device 200 is applied to a network device, and includes a determining module 201, a receiving module 202 and a sending module 203.

The determining module 201 is configured to determine a release condition for a CHO handover command. Wherein the release condition is used to instruct a UE to release the CHO handover command if the release condition is satisfied.

In an embodiment of the present disclosure, the CHO handover command includes at least one CHO handover command.

The determining module 201 is further configured to configure an information field corresponding to a release under an idle state or an inactive state for each of the at least one CHO handover command. Wherein the information field is used to instruct the UE whether to release the CHO handover command when the UE enters the idle state or the inactive state.

The receiving module 202 is configured to receive a first indication message. The determining module 201 is configured to determine that the UE stores an unreleased CHO handover command based on the first indication message.

The sending module 203 is configured to send a request message for reporting a CHO handover command in response to the UE entering a connected state.

In the embodiment of the present disclosure, the receiving module 202 is further configured to receive a second indication message, and determine the CHO handover command stored by the UE based on the second indication message.

In the embodiment of the present disclosure, the determining module 201 is further configured to determine an information field configured for the CHO handover command corresponding to a release under the idle state or the inactive state, and determine to release or reconfigure the CHO handover command based on the information field.

With regard to the device in the above embodiment, the specific manner in which each module performs operations has been described in detail in the embodiment of the method, and will not be described in detail here.

Figure 19:
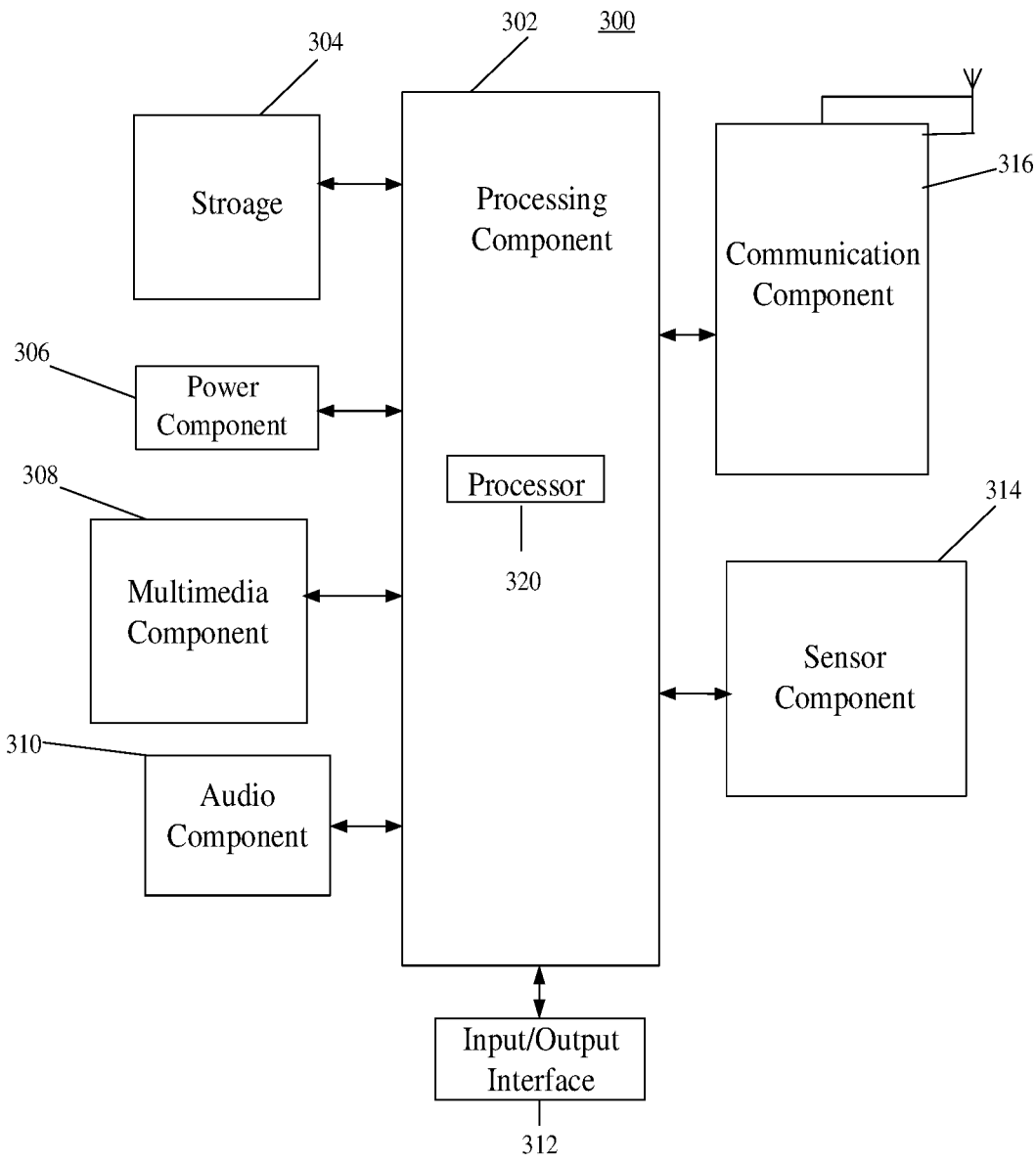
FIG. 19 is a block diagram illustrating a device for indicating, according to an example embodiment.

FIG. 19 is a block diagram illustrating a device 300 for indicating, according to an example embodiment. For example, the device 300 may be a mobile phone, computer, digital broadcast terminal, messaging transceiver, game console, tablet device, medical device, fitness device, personal digital assistant, etc.

Referring to FIG. 19, a device 300 may include one or more of a processing component 302, a memory 304, a power component 306, a multimedia component 308, an audio component 310, an input/output (I/O) interface 312, a sensor component 314, and a communication component 316.

The processing component 302 generally controls the overall operations of the device 300, such as operations associated with displaying, phone calls, data communications, camera operations, and recording operations. The processing component 302 may comprise one or more processors 320 to execute instructions to complete some or all of the steps of the information sending method described herein. In addition, the processing component 302 may comprise one or more modules to facilitate interactions between the processing component 302 and other components. For example, processing component 302 may comprise a multimedia module to facilitate interactions between the multimedia component 908 and the processing component 302.

The memory 304 is configured to store various types of data to support operations on the device 300. Examples of such data comprise instructions for any application or method operating on the device 300, contact data, phonebook data, messages, pictures, videos, etc. The memory 304 may be implemented by any type of volatile or non-volatile memory device or a combination thereof, such as static random access memory (SRAM), electrically erasable programmable read-only memory (EEPROM), erasable programmable read-only memory (EPROM), programmable read-only memories (PROM), read-only memories (ROM), magnetic memory, flash memory, disks or optical disks.

The power component 306 provides power to the various components of the device 300. Power component 306 may comprise a power management system, one or more power supplies, and other components associated with generating, managing, and distributing power for device 300.

The multimedia component 308 comprises a screen providing an output interface between the device 300 and a user. In some embodiments, the screen may comprise a liquid crystal display (LCD) and a touch panel (TP). If the screen comprises a touch panel, the screen may be implemented as a touch screen to receive input signals from a user. The touch panel comprises one or more touch sensors to sense touches, swipes, and gestures on the touch panel. The touch sensor may not only sense the boundary of a touch or a swipe action, but also detect the duration and the pressure associated with the touch or the sliding action. In some embodiments, the multimedia component 308 comprises a front facing camera and/or a rear facing camera. When the device 300 is in operating mode, such as shooting mode or video mode, the front facing camera and/or the rear facing camera may receive external multimedia data. Each front facing camera and rear facing camera can be a fixed optical lens system or have focal length and optical zoom capabilities.

The audio component 310 is configured to output and/or input audio signals. For example, the audio component 310 comprises a microphone (MIC), and when the device 300 is in operating mode, such as calling mode, recording mode, and speech recognition mode, the microphone is configured to receive external audio signals. The received audio signals may be further stored in the memory 304 or transmitted via the communication component 316. In some embodiments, the audio component 310 further comprises a speaker for outputting audio signals.

The I/O interface 312 provides an interface between the processing component 302 and peripheral interface modules, and the peripheral interface modules may be a keyboard, a click wheel, buttons, etc. These buttons may comprise, but are not limited to: a home button, a volume button, a launch button, and a lock button.

The sensor component 314 comprises one or more sensors for providing a state assessment of various aspects of the device 300. For example, sensor component 314 may detect the on/off status of device 300, relative positioning of the components, and the components are, for example, a display and a keypad of device 300, and the sensor component 314 may further detect the change in the position of device 300 or a component of the device 300, the presence or absence of user contact with device 300, the orientation or acceleration/deceleration of the device 300 and the temperature change of the device 300. The sensor component 314 may comprise a proximity sensor configured to detect the presence of a nearby object in the absence of any physical contact. The sensor component 314 may also comprise an optical sensor, such as a CMOS or CCD image sensor, for use in imaging applications. In some embodiments, the sensor component 314 may further comprise an acceleration sensor, a gyro sensor, a magnetic sensor, a pressure sensor, or a temperature sensor.

The communication component 316 is configured to facilitate wired or wireless communication between the device 300 and other devices. The device 300 may access a wireless network based on a communication standard, such as WiFi, 2G or 3G, 4G LTE, 5G NR, or a combination thereof. In an exemplary embodiment, the communication component 316 receives broadcast signals or broadcast associated information from an external broadcast management system via a broadcast channel. In an exemplary embodiment, the communication component 316 also comprises a near field communication (NFC) module to facilitate short-range communications. For example, the NFC module may be implemented based on Radio Frequency Identification (RFID) technology, Infrared Data Association (IrDA) technology, Ultra Wideband (UWB) technology, Bluetooth (BT) technology, and other technologies.

In an example embodiment, the device 300 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for executing any of the described methods.

In an exemplary embodiment, a non-transitory computer-readable storage medium comprising instructions is also provided, such as memory 304 comprising instructions, and the above instructions can executed by processor 320 of device 300 to perform any of the methods described herein. For example, the non-transitory computer readable storage medium may be a ROM, random access memory (RAM), CD-ROM, magnetic tape, floppy disk, optical data storage device, and the like.

Figure 20:
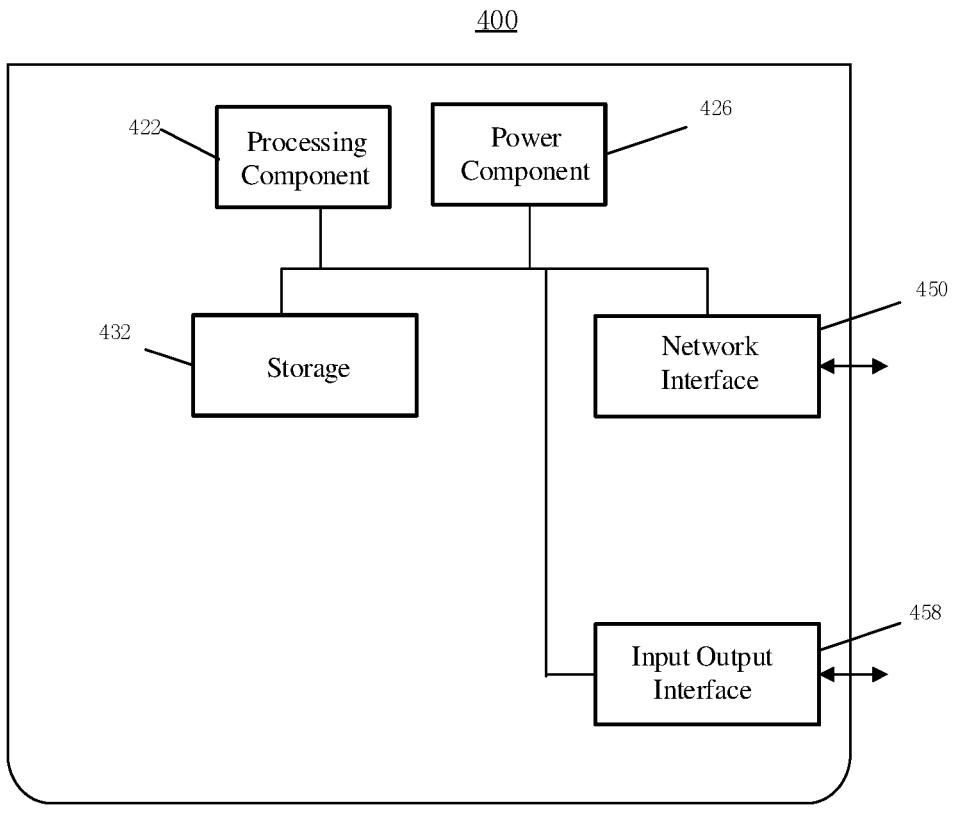
FIG. 20 is a block diagram illustrating a device for indicating, according to an example embodiment

FIG. 20 is a block diagram illustrating a device 400 for indicating according to an example embodiment. For example, the device 400 may be provided as a server. Referring to FIG. 20, the device 400 includes a processing component 422, which further includes one or more processors (not shown), and a memory resource such as memory, represented by storage 432, for storing instructions executable by the processing component 422, such as application programs. Applications stored in the storage 432 may include one or more modules that each corresponds to a set of instructions. Further, the processing component 422 is configured to execute instructions to perform any of the methods described herein.

The device 400 may also include a power component 426 configured to perform power management of the device 400, a wired or wireless network interface 450 configured to connect the device 400 to a network, and an input/output (I/O) interface 458. The device 400 may operate based on an operating system stored in the storage 432, such as Windows Server™, Mac OS XTM, Unix™, Linux™, FreeBSD™, or the like. The indication devices 100 and 200 can include the hardware found in either device 300 and/or 400 for performing the functions described herein.

In some examples, an indication method, which is applied to a user device, such as user equipment (UE), comprises: determining a release condition for a conditional handover (CHO) handover command; releasing the CHO handover command in response to the release condition being satisfied.

In some examples, determining the release condition for the CHO handover command includes: determining the release condition based on indications of a network device or protocol provisions.

In some examples, releasing the CHO handover command in response to the release condition being satisfied includes: determining a time elapsed since the CHO handover command has been received by the UE; releasing the CHO handover command in response to the elapsed time exceeding a preset effective time.

In some examples, the effective time is an effective time determined based on a timer, and the method further includes: in response to receiving the CHO handover command, controlling the timer to start timing.

In some examples, releasing the CHO handover command in response to the release condition being satisfied includes: determining an area in which a UE is configured with the CHO handover command; in response to the determined area exceeding a preset effective area, releasing the CHO handover command.

In some examples, releasing the CHO handover command in response to the release condition being satisfied includes: completing a handover operation based on the CHO handover command, and releasing the CHO handover command.

In some examples, the method further includes: in response to a handover target cell of a CHO handover command being a serving cell accessed by a UE, determining that the CHO handover command is not to be executed; and/or in response to the CHO handover command being configured by a cell other than the serving cell, determining that the CHO handover command is not to be executed.

In some examples, a release condition is plural; in response to the release condition being satisfied, releasing the CHO handover command, including: in response to at least one of a plurality of the release conditions being satisfied, determining to release the CHO handover command; or in response to all of the plurality of the release conditions being satisfied, determining to release the CHO handover command.

In some examples, releasing the CHO handover command in response to the release conditions being satisfied includes: in response to the UE entering an idle state or an inactive state, determining an information field corresponding to a release under the idle state or the inactive state in the CHO handover command; releasing the CHO handover command based on the information field.

In some examples, the method further includes: in response to the UE entering a connected state, if the UE stores an unreleased CHO handover command, sending a first indication message configured to indicate to the serving cell accessed by the UE that the UE stores an unreleased CHO handover command.

In some examples, the method further includes: in response to receiving a request message for reporting a CHO handover command, sending a second indication message configured to indicate the CHO handover command stored by the UE.

In some examples, either one or both of the first indication message and the second indication message include a network device identifier indicating a network device which has configured the CHO handover command, where the network device identifier is used by a network device corresponding to the serving cell to determine whether to release or reconfigure the CHO handover command.

In some examples, an indication method, which is applied to a network device, comprises: determining a release condition for a CHO handover command, where the release condition is used to instruct a UE to release the CHO handover command if the release condition is satisfied.

In some examples, the CHO handover command comprises at least one CHO handover command; the method further comprising: configuring an information field corresponding to a release under an idle state or an inactive state for each of the at least one CHO handover command; where the information field is used to instruct the UE whether to release the CHO handover command when entering the idle state or the inactive state.

In some examples, the method further comprises: receiving a first indication message; determining that the UE stores an unreleased CHO handover command based on the first indication message.

In some examples, the method further comprises: in response to the UE entering a connected state, sending a request message for reporting a CHO handover command.

In some examples, the method further comprises: receiving a second indication message; determining the CHO handover command stored by the UE based on the second indication message.

In some examples, after determining the CHO handover command stored by the UE, the method further comprises: determining an information field configured for the CHO handover command corresponding to a release under the idle state or the inactive state; determining to release or reconfigure the CHO handover command based on the information field.

The technical solution provided by the embodiments of the present disclosure may include the following beneficial effects: by configuring a release condition for a CHO handover command, a UE may determine to release the CHO handover command when the release condition is triggered. Therefore, the CHO handover command is released without a release command by a network device, and the situations of a handover failure, service interruption, and the like caused by the CHO handover command not being released can be avoided.

It is further understood that "a plurality" in the disclosure means two or more, and other quantifiers are similar. "And/or", describing the association relationship between the associated object, indicates that there may be three kinds of relationships. For example, A and/or B, indicates three cases: A existing alone, A and B existing simultaneously, and B existing alone. The character "/" generally indicates that the contextual object is in an "or" relationship. The "a," "the," and "the" in singular forms are also intended to include the plural forms unless the context clearly dictates otherwise.

It is further understood that the terms "first" and "second" and the like are used to describe various information. However, the information should not be limited to these terms. These terms are used only to distinguish one type of information from another without indicating a particular order or level of importance. In fact, the expressions "first" and "second" can be used interchangeably. For example, without departing from the scope of the present disclosure, the first information may also be referred to as the second information, and similarly, the second information may also be referred to as the first information.

It is to be further understood that while operations are depicted in the figures in a particular order in embodiments of the present disclosure, they should not be construed as requiring that such operations be performed in the particular order shown or in serial order, or that all illustrated operations be performed, to achieve desirable results. Multitasking and parallel processing may be advantageous in certain environments.

Other embodiments of the disclosure will occur to those skilled in the art upon consideration of the specification and practice of the invention disclosed herein. This application is intended to cover any variations, uses, or adaptations of the disclosure that follow from the general principles of the disclosure and include common general knowledge or customary practice in the art not disclosed in this disclosure. It is intended that the specification and examples be considered as exemplary only, with a true scope and spirit of the disclosure being indicated by the following claims.

Wherein, in the embodiments of the present disclosure, the above embodiments may be implemented individually or in combination.

It is to be understood that the present disclosure is not limited to the precise constructions which have been described herein and shown in the accompanying drawings, and that various modifications and changes may be made without departing from the scope thereof. The scope of the present disclosure is limited only by the appended claims.

The invention claimed is:

1. An indication method, applied to user equipment (UE), comprising:

determining a release condition for a conditional handover (CHO) handover command; and releasing the CHO handover command in response to the release condition being satisfied, comprising:

in response to the UE entering at least one of an idle state or an inactive state, determining an information field corresponding to a release under the idle state or the inactive state in the CHO handover command; and releasing the CHO handover command based on the information field;

the method further comprising:

in response to the UE entering a connected state, if the UE stores an unreleased CHO handover command, sending a first indication message configured to indicate to a serving cell accessed by the UE that the UE stores the unreleased CHO handover command;

in response to receiving a request message for reporting the unreleased CHO handover command, sending a second indication message configured to indicate the unreleased CHO handover command that is stored by the UE, wherein at least one of the first indication message or the second indication message include a network device identifier indicating a network device which has configured the unreleased CHO handover command, and the network device identifier is used by a network device corresponding to the serving cell to determine to release or reconfigure the unreleased CHO handover command.

2. The indication method according to claim 1, wherein determining the release condition for the CHO handover command comprises:

determining the release condition based on indications of a network device or protocol provisions.

3. The indication method according to claim 1, wherein releasing the CHO handover command in response to the release condition being satisfied further comprises:

determining a time elapsed since the CHO handover command has been received by the UE; and releasing the CHO handover command in response to the elapsed time exceeding a preset effective time.

4. The indication method according to claim 3, wherein the effective time is determined based on a timer, and the method further comprises:

in response to receiving the CHO handover command, controlling the timer to start timing.

5. The indication method according to claim 1, wherein releasing the CHO handover command in response to the release condition being satisfied further comprises:

determining an area in which the UE configured with the CHO handover command is located; and in response to the area exceeding a preset effective area, releasing the CHO handover command.

6. The indication method according to claim 1, wherein releasing the CHO handover command in response to the release condition being satisfied further comprises:

completing a handover operation based on the CHO handover command, and releasing the CHO handover command.

7. The indication method according to claim 1, the method further comprising at least one of:

in response to a handover target cell of the CHO handover command being a serving cell accessed by the UE, determining that the CHO handover command is not to be executed; or in response to the CHO handover command being configured by a cell other than the serving cell, determining that the CHO handover command is not to be executed.

8. The indication method according to claim 1, further comprising a plurality of release conditions;

releasing the CHO handover command in response to at least one of the plurality of release conditions being satisfied.

9. An indication method, applied to a network device, comprising:

determining a release condition for a conditional handover (CHO) command, and wherein the release condition is used to instruct user equipment (UE) to release the CHO handover command if the release condition is satisfied, wherein the CHO handover command comprises at least one CHO handover command;

the method further comprising:

configuring, for each of the at least one CHO handover command, an information field corresponding to a release under at least one of an idle state or an inactive state, wherein the information field is used to instruct the UE whether to release the CHO handover command when entering at least one of the idle state or the inactive state;

receiving a first indication message;

determining that the UE stores an unreleased CHO handover command based on the first indication message;

in response to the UE entering a connected state, sending a request message for reporting the unreleased CHO handover command;

receiving a second indication message; and determining the unreleased CHO handover command stored by the UE based on the second indication message, wherein after determining the unreleased CHO handover command stored by the UE, the method further comprises:

determining an information field configured for the unreleased CHO handover command corresponding to a release under at least one of the idle state or the inactive state; and determining to release or reconfigure the unreleased CHO handover command based on the information field.

10. An indication device, comprising:

a processor; and a non-transitory memory for storing processor-executable instructions;

wherein the processor is configured to perform operations comprising:

determining a release condition for a conditional handover (CHO) handover command; and releasing the CHO handover command in response to the release condition being satisfied, comprising:

in response to user equipment (UE) entering at least one of an idle state or an inactive state, determining an information field corresponding to a release under the idle state or the inactive state in the CHO handover command; and releasing the CHO handover command based on the information field;

the operations further comprising:

in response to the UE entering a connected state, if the UE stores an unreleased CHO handover command, sending a first indication message configured to indicate to a serving cell accessed by the UE that the UE stores the unreleased CHO handover command;

in response to receiving a request message for reporting the unreleased CHO handover command, sending a second indication message configured to indicate the unreleased CHO handover command that is stored by the UE, wherein at least one of the first indication message or the second indication message include a network device identifier indicating a network device which has configured the unreleased CHO handover command, and the network device identifier is used by a network device corresponding to the serving cell to determine to release or reconfigure the unreleased CHO handover command.

11. A non-transitory computer readable storage medium storing instructions for an indication method program, when executed by a processor of a mobile terminal, enables the mobile terminal to perform the indication method according to claim 1.

* * * * *